United States Patent [19]
Mouly et al.

[11] Patent Number: 4,749,400
[45] Date of Patent: Jun. 7, 1988

[54] DISCRETE GLASS SHEET CUTTING

[75] Inventors: Raymond J. Mouly, Pittsburgh; Gerald E. Kunkle, New Kensington; Dewitt W. Lampman, Hampton Township, Allegheny County; Jack A. Bricker, Tarentum, all of Pa.

[73] Assignee: PPG Industries, Inc., Pittsburgh, Pa.

[21] Appl. No.: 941,241

[22] Filed: Dec. 12, 1986

[51] Int. Cl.[4] .............................................. C03B 21/02
[52] U.S. Cl. .......................................... 65/97; 65/70; 65/105; 65/112; 65/113; 65/174
[58] Field of Search ................... 65/70, 97, 105, 112, 65/113, 174, 176

[56] References Cited

U.S. PATENT DOCUMENTS

| | | |
|---|---|---|
| 1,339,229 | 5/1920 | Slingluff . |
| 1,457,491 | 6/1923 | Beebe . |
| 1,550,428 | 8/1925 | Corl . |
| 1,560,077 | 11/1925 | Gelstharp . |
| 1,836,363 | 12/1931 | Drake . |
| 2,022,466 | 11/1935 | Hess .................... 65/174 X |
| 2,243,149 | 5/1941 | Despret . |
| 3,124,444 | 3/1964 | Ritter, Jr. et al. . |
| 3,189,424 | 6/1965 | Brichard et al. . |
| 3,193,367 | 7/1965 | Giffen . |
| 3,453,097 | 7/1969 | Hafner . |
| 3,486,673 | 12/1969 | Madge . |
| 3,543,979 | 12/1970 | Grove . |
| 3,584,773 | 6/1971 | Grove . |
| 3,587,956 | 6/1971 | Oelke et al. . |
| 3,690,527 | 9/1972 | Bustraan et al. . |
| 3,754,884 | 8/1973 | McDavid et al. . |
| 3,843,346 | 10/1974 | Edge et al. . |
| 3,875,766 | 4/1975 | French . |
| 3,885,943 | 5/1975 | Chui . |
| 3,930,825 | 1/1976 | Chui . |
| 3,934,995 | 1/1976 | French . |
| 3,935,419 | 1/1976 | Lambert et al. . |
| 4,139,359 | 2/1979 | Johnson et al. . |
| 4,162,907 | 7/1979 | Anderson . |
| 4,197,108 | 4/1980 | Frank et al. . |
| 4,204,853 | 5/1980 | Seymour . |
| 4,361,429 | 11/1982 | Anderson et al. . |

FOREIGN PATENT DOCUMENTS

| | | | |
|---|---|---|---|
| 2567872 | 7/1984 | France . | |
| 0759464 | 8/1980 | U.S.S.R. .............................. | 65/112 |

Primary Examiner—Arthur Kellogg
Attorney, Agent, or Firm—Andrew C. Siminerio

[57] ABSTRACT

Glass shapes and sheets are cut directly from a heated glass ribbon while maintaining the optical quality of the cut glass. A float glass ribbon is removed from a glass forming chamber and prior to annealing, a line of cut is heated to its softening temperature. A blade arrangement thereafter penetrates the glass along the heated line of cut to sever the glass. During the line heating and cutting operation, the overall glass temperature is maintained above the strain point of the glass.

82 Claims, 4 Drawing Sheets

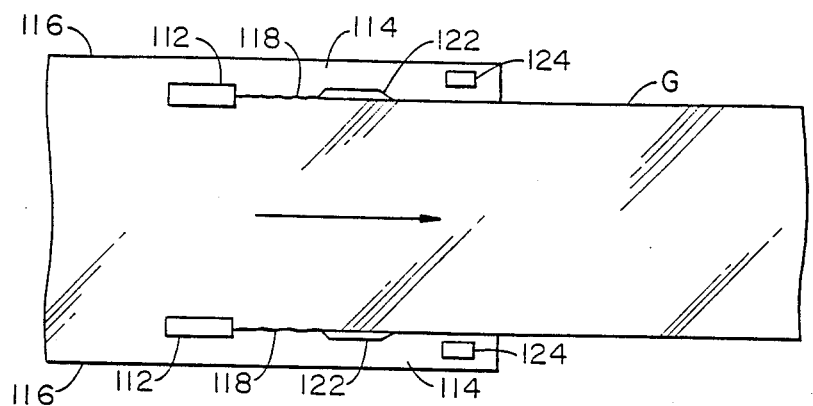
FIG. 10
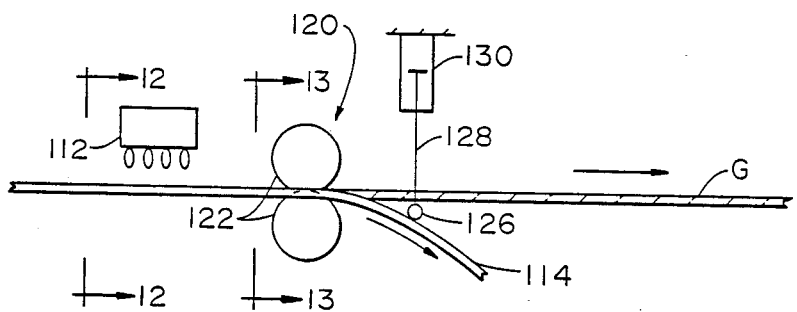
FIG. 11
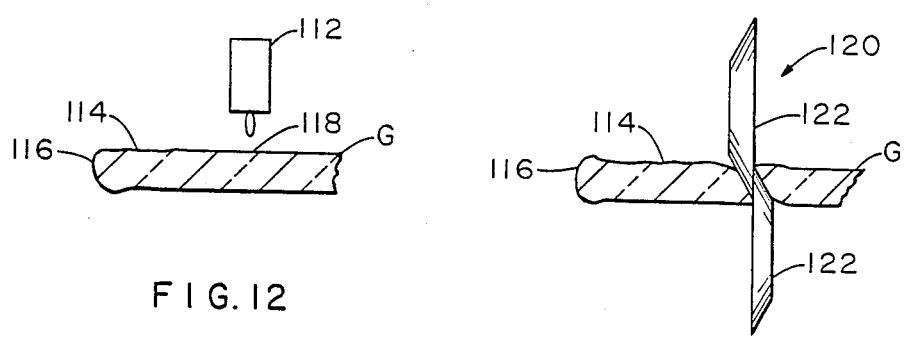
FIG. 12
FIG. 13

DISCRETE GLASS SHEET CUTTING

BACKGROUND OF THE INVENTION

1. Field of the Invention

This invention relates to the cutting of glass sheets and more particularly to the cutting of glass sheets from a heated glass ribbon while maintaining quality optics in the cut glass sheets.

2a. Technical Considerations

The fabrication of flat or bent glass products conventionally requires two separate and distinct processes: primary processing and secondary processing.

The primary processing includes forming a glass ribbon from molten glass by either floating the molten glass on a bath of tin or pulling a sheet of glass from a molten glass bath. In the float forming process, the molten glass is deposited and floated on a molten tin bath to form a ribbon, for example as disclosed in U.S. Pat. No. 3,843,346 to Edge et al. The float glass ribbon starts to cool and its thickness is established while on the tin bath. The ribbon is thereafter lifted off of the tin bath and conveyed into an annealing zone where it is controllably cooled to a temperature below its strain point. In the sheet forming process, the thickness of the glass sheet is established while it is being pulled from the pool of molten glass and is cooled thereafter, for example as disclosed in U.S. Pat. No. 1,339,229 to Slingluff. After annealing, the ribbon is cut into individual glass sheets for subsequent secondary processing.

Secondary processing may include any number of additional glass sheet processing procedures. For example, the large sheets may be cut into smaller, more easily handleable sheets prior to cutting the glass sheet to its final shape. The final shape may be rectangular as in desk tops, glazing units, etc. or maybe more complex as in special glazing designs or automotive windows. After cutting the glass to shape it may be drilled and/or edged and/or bent to shape. The drilling and edging operations are generally performed while the glass is at room temperature. These operations may leave small chips in the glass edge that may act as stress concentration points and lead to subsequent failure and breakage. In the shaping operation, the cut glass is reheated to its heat deformable temperature, approximately 1150° F. to 1250° F. (621° C. to 677° C.) for typical soda-lime-silica glass. The heating and bending operations may be performed in any of a number of different methods. For example, glass sheets may be conveyed on rolls through a heating furnace for entry into a so called horizontal press bending station as in U.S. Pat. No. 4,197,108 to Frank et al. or conveyed on a pressurized gas bed, or gas hearth, through a heating furnace for entry into a bending station where the glass sheet is shaped by a drop forming process as depicted in U.S. Pat. No. 4,204,853 to Seymour or the glass sheet to conveyed curved forming rolls to be shaped by a roll forming process as taught in U.S. Pat. No. 4,139,359 to Johnson et al.

After the cold processing and/or heating for bending, the glass may be heat strengthened. In the case of room temperature glass, the glass sheet is reheated to a temperature above its annealing range and then rapidly cooled through the annealing range to its strain point to impart a temper in the glass sheet. In the case of bent glass, after the bending operation, the glass sheet is rapidly cooled to impart temper.

The present practice of fabricating glass products with acceptable optical quality such as windows, mirrors, and the like requires the practice of the primary and secondary processes. It is apparent that there would be significant cost savings if the primary or secondary process could be modified or the two processes could be integrated into a single process so as to eliminate certain steps, e.g. reheating, and improve the finished product, e.g. high quality glass edge. There would be additional cost savings if the primary processing included float forming of a glass ribbon so that the glass would have its final glass thickness and optical quality as it is removed from the tin bath without any additional stretching, grinding, or polishing operation.

2b. Patents of Interest

U.S. Pat. Nos. 3,189,424 to Brichard et al.; 3,486,673 to Madge; 3,690,527 to Bustrann et al.; 3,754,884 to McDavid et al.; and 3,875,766 to French teach the severing of a drawn glass ribbon. In each the glass ribbon is cooled so that a major surface of the glass is susceptible to scoring by a scribing apparatus and subsequently fractured along the scored line.

U.S. Pat. Nos. 1,550,428 to Corl; 1,560,077 to Gelstharp; and 2,243,149 to Despret teach the severing of a glass ribbon in a sheet glass operation while the ribbon is still in a plastic state. In particular, Corl teaches the use of severing ribs along each major surface of the ribbon to effect a "biting into" of the sheet disposed therebetween. In Gelstharp, a cutting wheel mounted on a carriage and movable along the transverse direction of the ribbon is used to sever the still plastic glass sheet ribbon. In Despret, a roller with a knife blade is rotated at a predetermined speed so that the blade cuts the soft glass.

U.S. Pat. No. 3,124,444 to Ritter, Jr. et al. teaches a method for continuously removing the marginal edge or border portions of a moving ribbon of glass while it is in a plastic condition. The pair of circular cutting discs are arranged at the edge of the ribbon so that the ribbon passes therebetween and the edge of the ribbon is cut from the remainder of the ribbon.

French Patent Publication No. 2 567 872 to Diaz et al. teaches a method for cutting glass sheets still in the plastic state. The glass passes over a pair of rotating knives which pinch the glass almost through its entire thickness. A first set of knives are positioned radially around a cutting roll to continuously cut the glass sheet in its longitudinal direction, and a second set of knives are positioned longitudinally along the length of the cutting rolls to periodically cut the glass sheet in the transverse direction.

U.S. Pat. Nos. 3,453,097 to Hafner; 3,543,979 to Grove et al.; 3,885,943 and 3,930,825 to Chui; and 3,935,419 to Lambert et al. teach the cutting of glass with a laser beam. In Hafner the parameters of the laser are selected so that the glass sheet absorbs the laser energy and converts it into sufficient heat to enable separation of the glass sheet into pieces along a line swept by the laser beam. In Grove, which teaches cutting of glass sheets from a continuous glass ribbon, a laser beam scans the glass to induce a stress field in the glass which causes a controlled fracture along the scanned line. In the Chui patents, lasers are used to vaporize the glass along the cutting line. In U.S. Pat. No. 3,930,825 a pair of lasers are used to cut shaped glass articles directly from a float glass ribbon. It is believed that the power of the laser and the time required by such a laser to vaporize the glass may be prohibitive in a high volume commercial operation.

U.S. Pat. No. 3,934,995 to French teaches a method for cutting discrete sheets from a glass ribbon as it emerges from a float line by subjecting a portion of the ribbon to a controlled quench to cool the glass, scribing the glass along the cooled line, and rapidly breaking the glass along the scribed line.

U.S. Pat. No. 3,193,367 to Giffen teaches a glass forming operation wherein a sheet of molten glass drawn from a pool of molten glass is positioned over a forming die, pressed into the die and severed by shearing elements that separate the glass from the remaining glass sheet during the pressing operation.

U.S. Pat. No. 3,584,773 to Grove teaches a method of cutting glass by employing high frequency dielectric heating of the glass through its thickness to cause a controlled fracture to run along the cutting line.

U.S. Pat. No. 3,687,956 to Oelke teaches a method and apparatus for cutting cooled glass plates by applying heat along a desired line of cut from a source which is spaced from the surface of the plate. The heat from a radiant heat source is restricted to narrow the path corresponding to the line of cut. By concentrating the heat, a large temperature differential is set up between the unheated portions of the glass sheet and the very limited heated area and the coincident stress buildup cases a break through the sheet.

U.S. Pat. No. 4,162,907 to Anderson teaches a method of cutting molten glass on a molten tin bath. An extruder applies the molten glass to the molten tin bath where a cutting frame is lowered over the bath to firmly hold the glass and a cutting mechanism cuts the molten glass into desired sizes. The molten glass is cut with a compressed air driven rotary blade which penetrates completely through the glass and into the molten tin.

U.S. Pat. No. 4,361,429 to Anderson et al. teaches a method and apparatus for forming articles from molten sheet glass. Glass is drawn from a pool of molten glass by a pair of rollers. The molten glass sheet is positioned over and conformed to a mold cavity by a combination of vacuum and/or gravity. While still in a molten condition, the sheet is pressed and cut into a finished article. A vacuum take-out lifts the finished article out of the mold.

These patents disclose glass cutting techniques, but they are not concerned with cutting a high optical quality glass ribbon that has been sufficiently cooled to allow handling of the glass without reducing its optical quality, but still hot enough so that the glass can be heat treated, i.e. tempered or annealed, without reheating the glass.

SUMMARY OF THE INVENTION

The object of the present invention is to cut glass while the glass is at a temperature at which it can be handled and resists marking, by heating a desired line of cut to the glass softening temperature, i.e., the temperature at which the glass can be cut without scoring and fracturing but below the temperature at which glass is vaporized, and penetrating the heat softened glass with a cutting blade.

In a preferred embodiment of this invention the glass is a continuously advancing float glass ribbon. The glass ribbon emerges from a float forming operation so that the final glass thickness and required optical quality are established in the glass as the glass is formed, without any additional processing such as stretching, grinding, polishing, etc. As the glass ribbon is removed from the molten tin in the float forming operation, it is sufficiently rigid to permit handling and conveying without marking or otherwise affecting it optical properties. Throughout the cutting operation the glass is maintained within a temperature range, such as its annealing range, that permits handling without marking and at the same time does not require additional heat to be provided to the glass for further processing, e.g., bending, tempering, annealing, etc. The glass is selectively reheated along a desired line of cut by high temperature flames, or other types of heaters, to its softening temperature. The line of cut may be straight, e.g., across the width of this advancing ribbon, or it may define the perimeter of a glass part to be severed from the ribbon. The heaters may be positioned above and below the major surfaces of this glass ribbon and advanced in the direction of the ribbon conveyance. After the line of cut is heated to the required temperature, a cutting device including a blade paralleling the line of cut penetrates the glass ribbon to sever the glass. Tha cutting blade is advanced in the direction of ribbon conveyance during cutting. The severed glass piece is transferred away from the advancing glass ribbon and the heaters and cutting device move back to their original positions.

In an additional embodiment of the present invention, glass parts are cut from a stationary glass sheet. At least the portions of a glass sheet in the vicinity of a desired line of cut are preheated to a temperature, e.g., annealing range, such that concentrated heat from line heaters directed along the line of cut will not fracture the sheet due to heat stress. The line heaters raise the temperature of the line of cut to its softening temperature. The sheet may either be advanced to a cutting station where a blade paralleling the heated line of cut penetrates the glass sheet to sever the glass part, or the glass sheet may remain stationery and the heaters may be removed from the sheet and the cutting blade be positioned adjacent the sheet to sever the glass part. The glass part is then removed from the glass sheet and transferred to a subsequent station for additional processing.

In a further embodiment of the invention, stationary heaters are positioned slightly inboard of the bulb edge of an advancing glass ribbon. A pair of rotary blades are aligned downstream from the heaters. The glass ribbon advances to and is cut along the heated line to sever the bulb edge. A biasing arrangement forces the bulb edge away from the remaining glass ribbon after it is severed.

BRIEF DESCRIPTION OF THE DRAWINGS

FIG. 10 a plan view of a bulb edge trimming arrangement for a glass ribbon, incorporating glass sheet heating and cutting equipment of the present invention with portions removed for clarity.

FIG. 11 is an elevational view of the equipment shown in the trimming arrangement of FIG. 10 with portions removed for clarity.

FIG. 12 is a cross sectional view through line 12—12 of FIG. 11 showing two pairs of heaters along the edge of the glass ribbon.

FIG. 13 is a cross sectional view through line 13—13 of FIG. 11 showing a pair of circular cutting blades severing the glass ribbon.

DETAILED DESCRIPTION OF THE INVENTION

The present invention is presented with respect to its use in cutting soda-lime-silica float glass but it should be appreciated that the invention may be used in any sheet material severing operation and in particular with any type of glass forming operation or glass composition.

In describing the instant invention, reference will be made to certain properties and reference temperatures of the glass. "Annealing point" and "strain point" are defined as the temperatures that correspond either to a specific rate of elongation of a glass fiber when measured by ASTM Method C336 or a specific rate of midpoint deflecting of a glass beam when measured by ASTM Method C598. At the annealing point, internal stresses are substantially relieved in a matter of minutes. At the strain point, internal stresses are substantially relieved in a matter of hours. The range of temperatures between the annealing point and the strain point is called the annealing range. During heat processing of glass, its temperature is lowered slowly (annealing) or quickly (tempering) through the annealing range. For typical soda-lime-silica float glass, the annealing point temperature is generally within the range of about 1000° F. to 1040° F. (538° C. to 560° C.), the strain point temperature is generally within the range of about 925° F. to 970° F. (496° C. to 521° C.), and the annealing range is about 925° F. to 1040° F. (496° C. to 560° C.). "Float glass optical quality" can be characterized by the optical power of its dominant transmitted defects. The defects, in the form of surface irregularities, generally have a wavelength in the range of approximately 0.75 inches to 2 inches (1.91 cm to 5.08 cm) and an optical power on the order of approximately 30 millidiopters or less.

Figure 1:
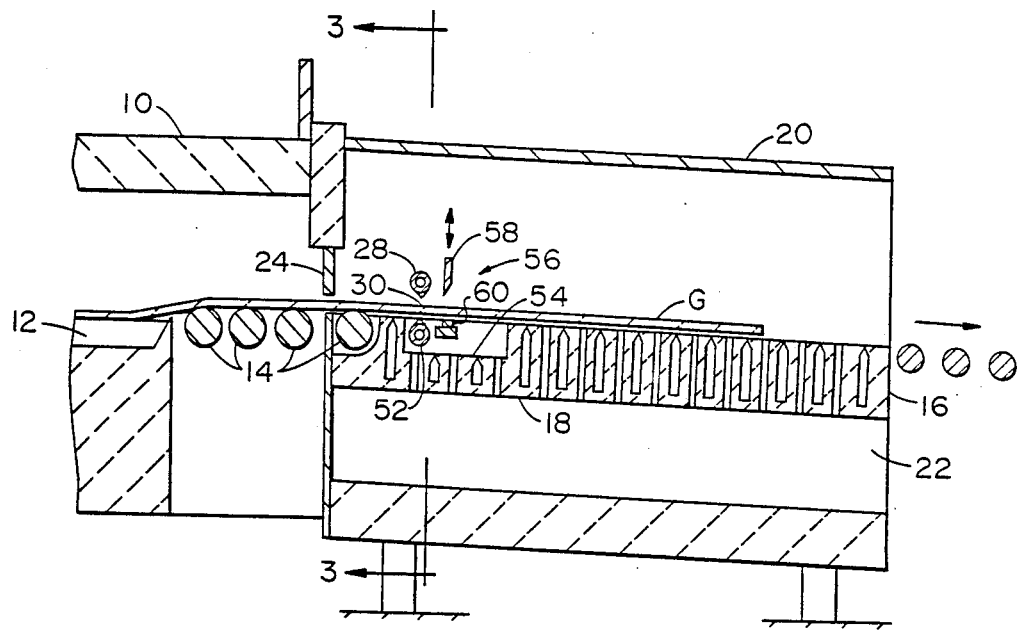
FIG. 1 is a longitudinal cross-sectional view of a preferred embodiment of the float glass ribbon heating and cutting equipment of the present invention.

FIG. 1 illustrates a float glass ribbon G as it exits a forming chamber 10. Because the ribbon G is a float glass ribbon, it has superior optical qualities and can be used in applications where undistorted viewing through the glass is required. The continuous glass ribbon G is removed from a molten metal bath 12, e.g., a molten tin bath by a series of rolls 14 onto a ribbon support 16 that may include a gas hearth support bed 18 or additional conveyor rolls (not shown) and into an annealing lehr (not shown). Although not limiting in the present invention, the gas hearth support bed 18 is preferably within temperature controlled chamber 20 to minimize heat loss in the ribbon, for reasons to be discussed later and includes a plenum 22 which forces hot pressurized air to the upper surface of the gas hearth 18 to provide a cushion of air to support the hot glass. Curtain 24 maintains the atmosphere within the forming chamber 10. The chamber 20, where the heating and cutting operation occurs, is generally within a temperature range of about 1080° F. to 1150° F. (582° C. to 621° C.) which is above the float glass annealing point temperature. The glass ribbon in the float glass process within this temperature range is sufficiently rigid so that it may be handled and contacted by the rolls 14 and other conveying equipment without marking so that its optical qualities remain undisturbed.

Figure 2:
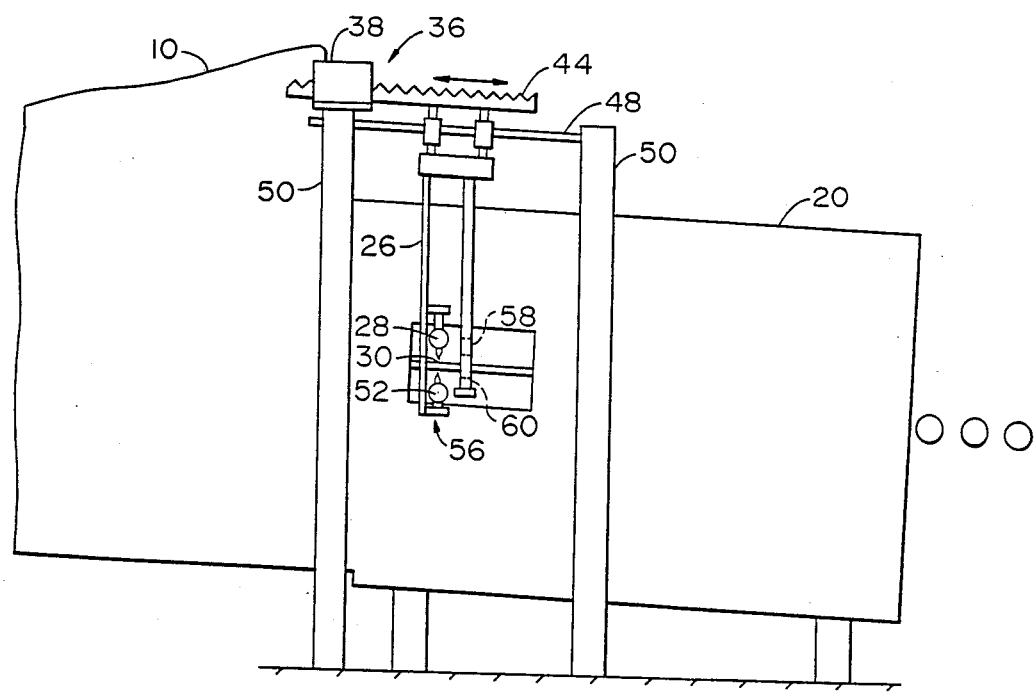
FIG. 2 is a view similar to that of FIG. 1 showing the sliding frame of the present invention.
Figure 3:
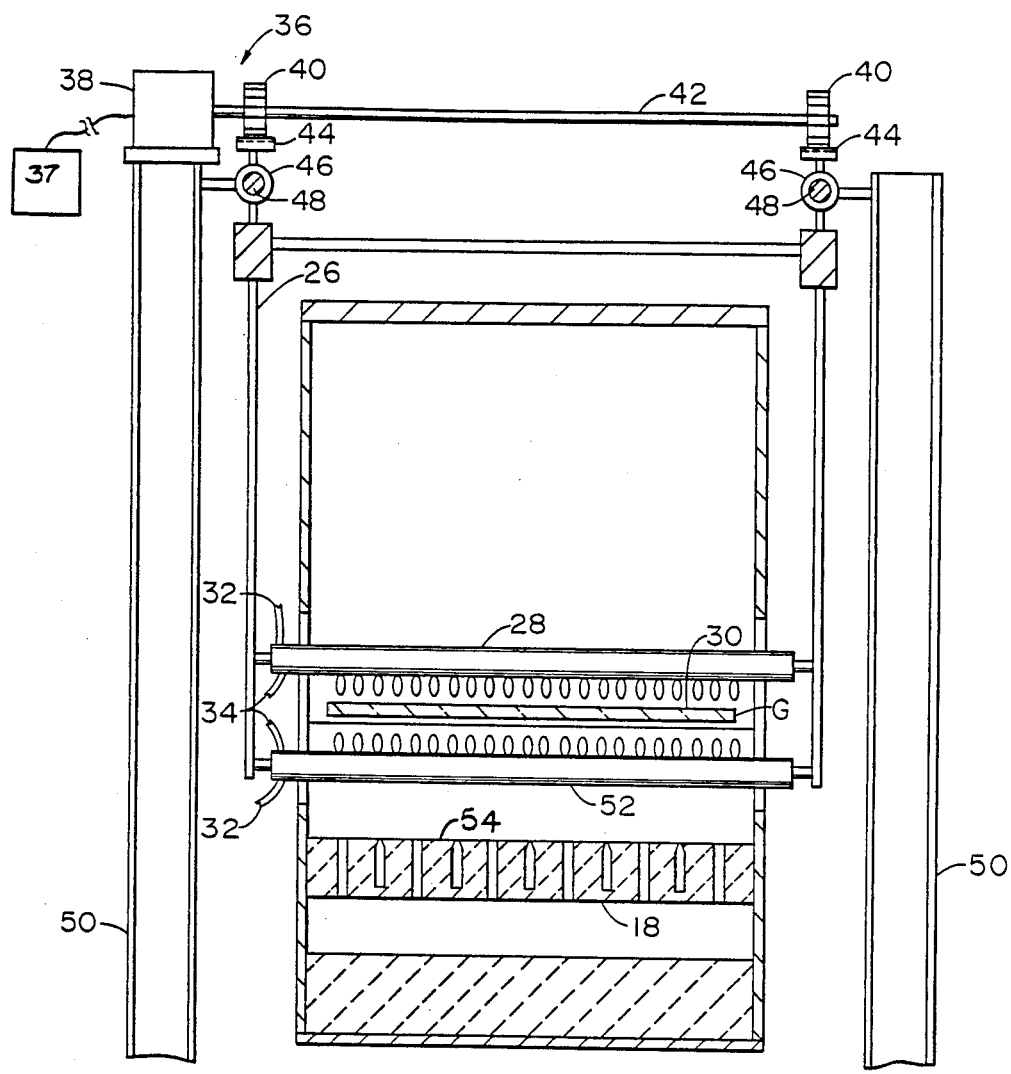
FIG. 3 is a view along line 3—3 of FIG. 1.

Referring to FIGS. 2 and 3, a support frame 26 supports a heater 28 which extends across the width of the ribbon G. The heater 28 directs concentrated high temperature heat at the hot glass sheet G to rapidly heat a selected line of cut 30 to its softening temperature range as will be discussed later. The heater 28 may be one of any of a number of commercially available heat sources as long as it can provide the required concentrated heat and direct it along the line of cut 30. Although not limited in the present invention, in the preferred embodiment, the heater 28 is a line burner that directs high temperature flames along the selected line of cut 30 of the glass ribbon G. Fuel line 32 and oxygen line 34 (optional) supply the burner 28 with necessary combustants to produce a high temperature flame. Heaters such as resistance type heaters, high frequency dielectric heaters, plasma torch heaters, lasers, or electron beam heaters may also be used.

In order to direct the flame from burner 28 along a fixed line 30 on the moving surface of the ribbon G, the frame 26 is provided with a drive arrangement 36 to allow the burner 28 to move at the same speed as the ribbon G. The movement of the frame 26 by the drive arrangement 36 may be controlled by a computer 37. After moving in the direction of the ribbon G for the time required to heat the line 30 to the softening temperature range, the frame 22 returns back to its starting position. The drive arrangement 36 should be capable of moving the heater 28 at a speed sufficient to reposition the heater 28 at its starting position as shown in FIG. 1 prior to or at the same time as the next line of cut 30 moves below the heater 28. Although not limiting in the present invention, the drive arrangement 36 of the particular embodiment depicted in FIGS. 1, 2, and 3 may include a motor 38 connected to drive sprockets 40 via shaft 42. The sprocket 40 engages gear racks 44 that are attached to slip collars 46 mounted on slide rails 48. The support frame 26 is supported from the collars 46. Columns 50 provide support for the slide rails 48 and motor 38. To move the frame 26, motor 38 turns the drive sprocket 40 which in turn moves the gear racks 44 forward or backward, i.e., left or right as viewed in FIG. 1, along the path defined by the slide rails 48.

The line burner 28 increases the temperature of the hot ribbon G along the cut line 30 preferably to at or above its softening point, i.e., a temperature at which the glass can be severed from the remainder of the ribbon without scoring and fracture but below the temperature at which the glass is vaporized. For typical soda-lime-silica float glass, the softening temperature is generally in the range of about 1325° F. to 1375° F. (718° C. to 746° C.). If required, in order to increase the speed at which the entire thickness of the ribbon is heated to the softening temperature, a second heater 52 may be positioned below the ribbon G in slot 54 of the gas hearth support 18 and parallel to the heater 28 so as to direct its focus of heat along line 30 from the lower side. The lower heater 52 would also be provided with a structural support and sliding frame so that the lower heater 52 could move at the same speed as the ribbon G for a distance sufficient so that top and bottom heaters could raise the temperature of the line 30 to the desired softening point. As shown in FIGS. 1, 2, and 3, in the preferred embodiment of the invention, top and bottom heaters are used and both are mounted on the support frame 26 so that they may be moved simultaneously.

It should be appreciated that the line of cut 30 can be heated to even higher temperatures but this will require additional power and/or a longer time to heat the glass. In addition, if the glass is heated to too high of a temperature, it may begin to deform and result in a degradation of the optical quality of the final glass product.

Because the line heaters 28 and 52 focus concentrated heat along a narrow band of the glass, there is a possibility of thermal shock in the glass, i.e., the glass may not have sufficient time to redistribute stresses within the glass established by the high temperature, thereby resulting in glass fracturing. To avoid this condition, the glass to be cut should be heated at least to its strain point temperature and preferably to at or above its annealing point temperature so as to relieve any internal stresses resulting from the concentrated heating without fracturing the glass. The entire sheet of glass need not be raised to this elevated temperature but rather only that portion of the glass that is in the vicinity of the line of cut, or the reheating zone. The width of the reheating zone depends on several factors such as the heating system characteristics, the chemical composition of the glass, its strain point, annealing point and softening point temperatures, and the rate at which the temperature of the reheating zone is raised. When the glass to be cut is conveyed directly from the ribbon forming process or when the glass is reheated for bending, the entire sheet is above the annealing point temperature so that the entire width of the sheet is the effective reheating zone that can redistribute the internal stresses. When only a portion of the glass is reheated, the reheating zone must be sufficiently wide to redistribute any thermal stress established by the heaters 28 and 52.

After the selected line of cut 30 within the reheating zone is heated to its heat softened temperature and while the remainder of the glass sheet is still at an elevated temperature, the hot ribbon G is cut along the line 30 with a ribbon severing device 56. The ribbon severing device 56 operates by moving a blade or blades through the glass sheet G along the heated line 30. In the particular embodiment of the invention illustrated in FIGS. 1 and 2, the severing device 56 is mounted on the frame 26 and includes a blade 58 positioned above the ribbon G and parallel to the heated line and an anvil member 60 positioned parallel to and below the blade 58 with the glass ribbon G passing therebetween. The anvil 60 is located within slot 54 of gas hearth support 18. If required, the temperature of the blade 58 and/or the anvil 60 may be controlled such that each is sufficiently hot so that the glass sheet is not cooled prior to cutting but not excessively hot so that the glass sheet may stick to them.

Figures 4, 5:
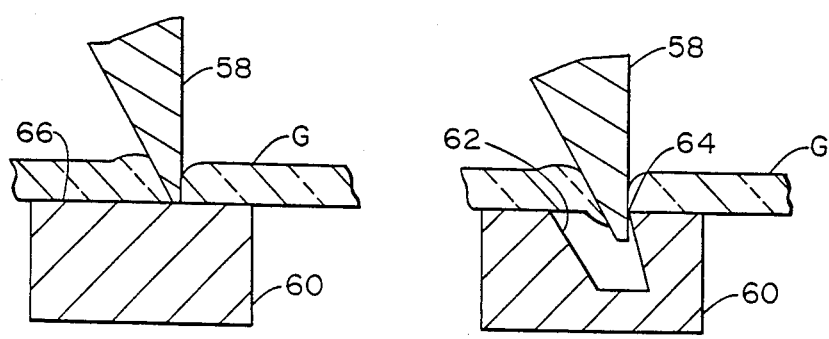
FIG. 4 is an enlarged cross-sectional view of the preferred glass ribbon cutting equipment.
FIG. 5 is an enlarged cross-sectional view of alternate glass ribbon cutting equipment.

To sever the glass ribbon G, the advancing rate of the frame 26 is slightly reduced so that the preheated line 30 is positioned between the blade 58 and the anvil 60. When the line of cut is positioned between the blade 58 and anvil 60, the frame 26 resumes its original advancing rate so that there is no relative movement between the ribbon G and frame 26. Thereafter, the blade 58 moves downward and/or the anvil 60 moves upward severing the ribbon G along the preheated line 30. The blade 58 and/or anvil 60 may be moved vertically in any convenient manner, such as, for example, hydraulic, pneumatic, or electric activators (not shown) or by, for the blade, its own dead weight. In the preferred embodiment, the anvil 60 includes a groove 62 as shown in FIG. 4. The edge 64 of the groove 62 acts as a second blade so that cutting is accomplished by moving the blade 58 through the glass sheet G and into the groove 62. As an alternative, the anvil 60 may have a solid surface 66 as shown in FIG. 5 with the glass severing being accomplished by penetrating the glass with the blade 58 and contacting surface 66. It should be noted that blade 58 does not have to fully penetrate glass G. The blade 58 may penetrate most of the glass sheet G thickness but stop short of contacting anvil 60. The glass sheet G can thereafter be separated from the remaining glass ribbon by a simple bending or "snapping" procedure after the ribbon is slightly cooled.

Although in the preferred embodiment of this invention, the severing operation occurs while there is no relative movement between the frame 26 and ribbon G, it should be appreciated that some relative movement may be permitted if the cutting action of the blade 58 is rapid enough to sever the glass without causing any additional optical distortion.

To improve its effectiveness, the blade 58 may be heat resistant and non-reactive with the glass. In addition, the blade 58 preferably should be capable of maintaining a sharp edge so as to reduce maintenance of the blade, e.g., resharping and/or replacement. A high strength material, such as stainless steel may be used for the blade and anvil.

During the severing operation, the blade 58 and anvil 60 move along with the ribbon G. After the severing operation is complete, the blade 58 and/or anvil 60 retracts and frame 26 moves to the left as shown in FIG. 1, back to its original position as the severed glass sheet is conveyed away from the remaining glass ribbon G, for example, but not limiting in the invention, by sloping the gas hearth support block 18 downward, away from the forming chamber 10 so that the severed portion will move away from the remaining glass ribbon G. As an alternative, driven conveyer rolls (not shown) may be used to move the severed glass sheet away from the advancing glass ribbon. In addition, the glass sheet may be transferred by a top vacuum pickup (not shown) that engages the upper surface of the glass sheet G while within chamber 20 and shuttles it to different processing stations for subsequent bending, edge finishing heat strengthening, annealing, etc., if required.

Figure 6:
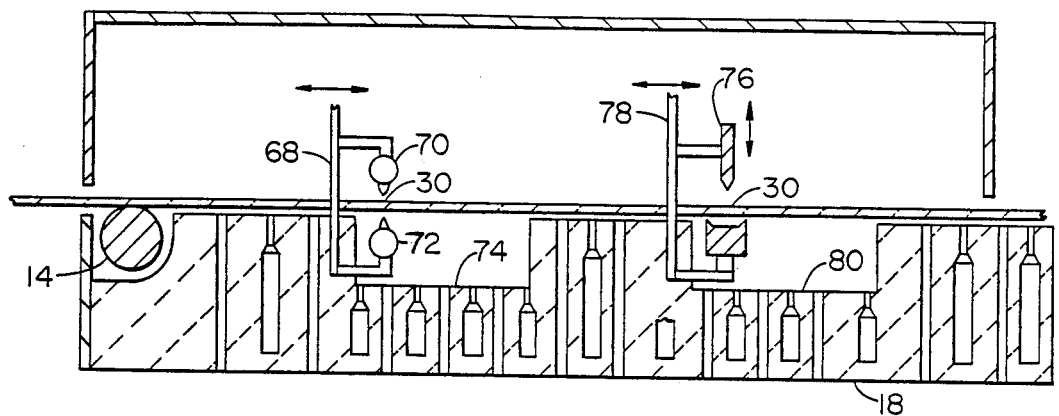
FIG. 6 is a cross-sectional side view of an alternate float glass ribbon heating and severing arrangement and equipment.

FIG. 6 illustrates an alternative heating and severing arrangement. Compared to the arrangement in FIG. 1, this configuration uses independent heating and severing frames. The heater frame 68 supports a top heater 70 (and a bottom heater 72 in slot 74 of gas hearth support 18 if required) across the ribbon G and slides in the conveyed direction of the glass ribbon G. After the ribbon G is heated along the line 30, the frame 68 moves back to is original position as the ribbon G continues moving along the gas hearth support block 18. When the preheated line reaches severing device 76, severing frame 78 begins to move within slot 80 along with the ribbon G. When aligned within the moving severing frame 78, the ribbon G is cut in manner similar to that already discussed. The alternate arrangement provides for independent adjustment of the heater frame 68 and the severing frame 78.

As can be seen in FIGS. 1 and 6, the maximum unsupported length of the glass ribbon G will be the width of slot 54 (FIG. 1) or slots 74 or 80 (FIG. 6) in gas hearth support 18.

The operation sequence described, supra, with respect to FIG. 1 may be modified to reduce the required width of the slot 54, thereby reducing the maximum unsupported length of the glass ribbon G. In particular, the computer 37 activates the drive arrangement 36 to advance the frame 26 along with the ribbon G and allow the burners 28 and 52 to heat the line of cut 30 to its heat softening temperature. After the heating, rather than reducing the advancing rate of the frame 26 to allow the ribbon G to advance relative to the frame 26, the computer 37 reverses the advancing direction of the frame 26 and moves it toward the forming chamber 10, i.e., to the left as viewed in FIG. 1, at a high speed. When the frame 26 has moved back to a position such that the line of cut 30 is between the blade 58 and anvil 60, it reverses its direction again and begins to advance forward, i.e., to the right as viewed in FIG. 1, along with the ribbon G so that there is no relative motion therebetween. This operating sequence reduces the total required travel of the frame 26 so that the width of the slot 54 is minimized.

The present invention, as so far disclosed, has been related to the severing of a moving flat glass ribbon while maintaining its optical quality and in particular, to severing a float glass ribbon and maintaining its float glass optical quality. It should be obvious that similar line heating and severing techniques may be used on a stationary sheet of flat glass. it is also apparent that the cutting of a glass sheet or ribbon is not limited to cutting along a straight line but rather can be curved or a continuous loop within the outer perimeter of the glass sheet or ribbon as shown in FIGS. 7 and 8.

In cutting individual glass sheets, portions of the sheet, at least within the cutting zone, must conform to a temperature profile such that the additional heat supplied by a line heater will not crack the glass sheet due to the temperature differential between the heated line and the surrounding glass as previously discussed. If the glass sheet has been cooled prior to cutting, the area of the sheet at least in the vicinity of the line of cut may have to be preheated. If the glass sheet is coming directly from a glass forming operation the entire glass sheet is inherently preheated and will not break when additional concentrated heat is directed toward the sheet. In the preferred embodiment of the invention, the temperature of the glass sheet at least within the cutting zone is at least its strain point temperature and preferably at or above its annealing point temperature. This elevated temperature may be maintained throughout the line heating and cutting operations by performing these operations in a heated cavity to limit heat loss. It should be noted that if the glass sheet is to be bent and is heated to its bending temperature prior to cutting, for example, 1050° F. to 1200° F. (566° C. to 649° C.) for typical soda-lime-silica float glass, the entire sheet will be at a temperature above the annealing point temperature. In the particular embodiment of the invention illustrated in FIGS. 7, 8, and 9, preheated sheet G is line heated at a heating station 82 to its softening point temperature along a selected line of cut 84 by top ring burner 86 and bottom ring burner 88. The sheet G is then conveyed to a cutting station 90 and severed along the heated line in a manner as previously discussed, such as, for example, cutting device 92 to form a cut part 94.

Figure 7:
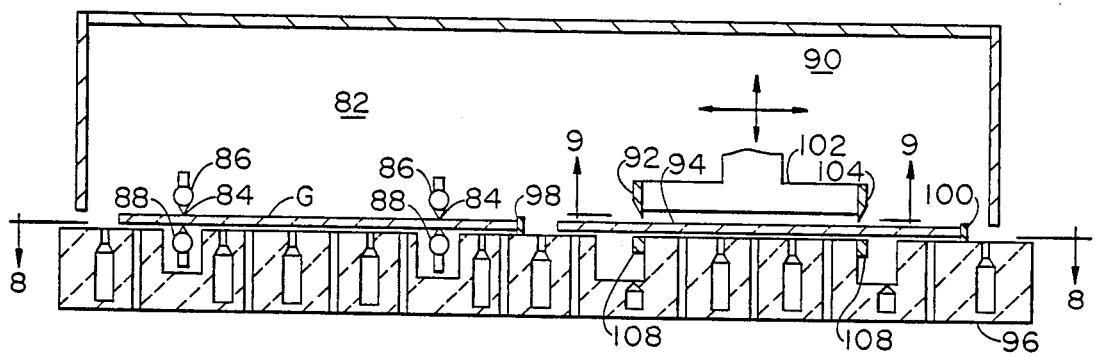
FIG. 7 is a cross-sectional side view of the preferred glass sheet heating and cutting arrangement.
Figure 8:
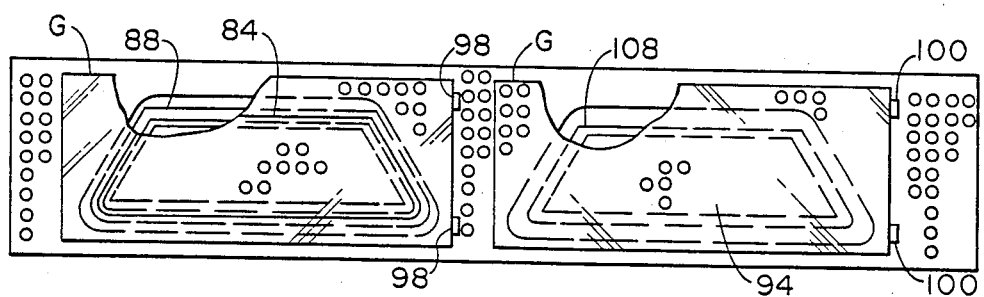
FIG. 8 is a plan view of the heating and cutting arrangement of FIG. 7 with portions removed for clarity.

Conveying between the heating station 82 and the cutting station 90 may be done in any convenient fashion such as, but not limited to, floating the glass sheet on a downwardly inclined gas hearth support 96 shown in FIG. 7 or by conveyor rolls (not shown) or a vacuum pickup (not shown). Stop member 98 and 100 may be used to position the glass sheet G in the heating station 82 and cutting station 90. As an alternative, the glass sheet G may remain stationary throughout the heating and severing operations with a line heater and severing device moving into and out of position as required.

After the heating and severing step, the cut glass sheet and the remaining glass, or cullet, are separated. A shuttling vacuum pickup with an apertured lower surface conforming to the outline of the cut part 94 may be used to lift the part from the remaining glass and transfer it to the next processing station. Although not limited in the present invention, in the preferred embodiment, the severing device 92 and the vacuum pickup may be incorporated into a single reciprocating and shuttling unit 102 to simplify and combine the cutting and removing operations. Blade 104 of the unit 102 defines the outline of the cut. The vacuum pickup 102 draws a vacuum through its apertured lower surface 106 only within the confines of the blade 104 outline so that in operation the unit 102 moves down to sever the glass sheet G via blade 104 and anvil 108, draws a vacuum and moves upward with the cut glass part 94 engaged thereagainst, leaving cullet glass 110 on the gas hearth support 96 to be disposed of is any convenient fashion. The unit 102 may now shuttle to the next processing station and deposit the cut shaped glass part 94.

Figure 9:
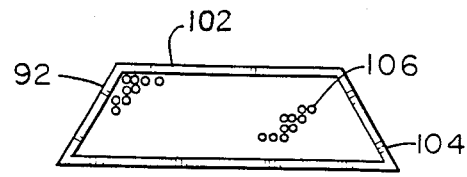
FIG. 9 is a view along line 9—9 in FIG. 7 showing the lower apertured surface of the cutter/vacuum pickup.

It should be appreciated that in the embodiment of the present invention illustrated in FIGS. 7, 8, and 9, when the sheet is reheated in order to avoid breakage due to the concentrated heat supplied by the burners 86 and 88, the advantage of not using additional heat as is apparent in the embodiment illustrated in FIGS. 1, 2, and 3 is negated. Nevertheless, the novel cutting technique as taught will still provide a superior cut edge as will be discussed.

The quality of the glass edge resulting from the cutting techniques taught in the present invention are superior to the glass edge formed by conventional scoring and fracturing techniques. The former glass edge will have a smooth, polished surface. In addition, since it is formed at an elevated temperature, i.e., at least at the strain point temperature, stresses in the glass along the cut line are redistributed and the possibility of venting at the the cut line is reduced. Furthermore, due to the high temperature, the glass may flow and heal any defects in the glass edge before it is cooled. As a result the edge has a higher mechanical strength and is more resistant to thermal stresses than a glass edge formed by conventional scoring and fracturing techniques.

Due to the nature of the severing techniques of the present invention, the surface of the glass may be modified so that the original specular quality of the glass may be slightly altered. As shown FIGS. 4 and 5, there may be some optical distortion immediately adjacent the cut edge due to the blade 46. As a result a glass sheet or part cut using the techniques taught in the present invention will maintain its float glass optical quality over the majority of its area with only a slight, if any change in optical quality immediately adjacent its cut edge.

It is apparent that the technology of the present invention may also be applied to cutting a glass sheet shape directly from a continuously moving ribbon.

Moving heaters and severing devices may heat and sever the glass sheet shape. A vacuum pickup may preferably move along with the ribbon G to engage the cut shape after severing. The vacuum pickup may be incorporated into the severing tool as already discussed so that after severing occurs, the cut shape is immediately lifted from the remaining glass ribbon.

The glass severing techniques of the present invention may also be used in removing the bulb edge from a continuously advancing glass ribbon. Referring to FIGS. 10, 11, and 12, stationary line heaters 112 are positioned above, and if required, below, the glass ribbon G along its outer portions 114 slightly inboard of its longitudinal bulb edge 116. The heaters 112 are of sufficient length and intensity such that as the glass ribbon advances from beneath the heaters 112, heated lines 118 are heated to within the glass softening temperature range. The bulb edge 116 is separated from the remaining portion of the advancing glass ribbon by cutting arrangement 120. In the particular embodiment shown in FIGS. 10, 11, and 12 the cutting arrangement 120 includes a pair of rotary blades 122 mounted downstream from the heaters 112 and aligned with the heated line 118. As the glass ribbon G advances through the rotary blades 122, bulb edge 116 is severed from the remaining advancing portion of the glass ribbon G. A biasing device 124, for example, such as a wheel 126 mounted on arm 128 of a piston 130, or a spring (not shown) may be positioned adjacent to and downstream of the rotary blades to deflect the severed bulb edge 116 away from the remaining ribbon and into a scrap glass collector (not shown). In the particular embodiment of the invention illustrated a FIGS. 10, 11 and 12, the blades 120 overlap so as to fully penetrate the ribbon G. As discussed earlier, the blades 120 may be positioned so as partially penetrate the glass ribbon, leaving a thin, uncut section that may be fractured downstream of the cut to separate the bulb edge from the remaining glass ribbon. Other cutting arrangements such as a single blade (not shown) oriented in a generally vertical positional at each heated line 118 or a cutting wire, (not shown) may be position downstream from the heaters 112 to sever the glass.

It should be appreciated that the previously discussed technique of severing the bulb edge 116 from the advancing ribbon G could also be used to make additional longitudinal cuts along the length of the ribbon G.

Throughout the heating and cutting operation disclosed herein, the float glass ribbon and sheets maintain their float glass optical qualities by handling the glass only when the majority of the glass is at a temperature at which the glass can be conveyed and operated on without marking or otherwise affecting its optical properties. If required, additional heat sources (not shown) can be used to maintain the glass sheet at a desired elevated temperature throughout the line heating and cutting operations. When the glass ribbon is severed or a glass part is cut from a glass sheet or ribbon as the ribbon leaves the float bath, and the temperature of the glass is maintained preferably above the glass annealing point temperature, any reheating of the glass required for bending and/or heat treatment is greatly reduced if not eliminated. As described, a glass part may be cut from the ribbon as it leaves the float bath, without the cooling required for scoring, and conveyed to additional processing stations at its elevated temperature without the additional steps of annealing the glass ribbon, cutting the ribbon into large blanks, storage of the blanks, reconveying the blanks, cutting shapes from the blanks to a desired configuration and reheating the cut shapes for bending, tempering, or annealing operations as is typical in conventional glass forming and shaping operations. The final cut glass part will have maintained the superior optical quality is had when it was initially removed from the tin in a float glass forming operation.

We claim:

1. A method of severing glass along a selected line of cut while maintaining its optical properties comprising:
   maintaining said glass at a temperature at which said glass is sufficiently rigid to be handled without marking or otherwise adversely affecting its optical properties;
   establishing a heating pattern to heat said line of cut of glass to or above its softening temperature, and to heat portions of said glass in the vicinity of said line of cut to at least about the strain point of said glass; and
   dividing said glass along said heated line of cut.

2. The method as in claim 1 wherein said glass is an advancing, continuous glass ribbon and further, wherein said establishing step includes directing heat from a heating device towards a major surface of said advancing ribbon along said line of cut.

3. The method as in claim 2 wherein said directing step includes directing high temperature flames from a line heater towards a major surface of said advancing ribbon along said line of cut.

4. The method as in claim 3 further including the step of advancing said line heater in the advancing direction of said ribbon.

5. The method as in claim 4 wherein line heater is a top line heater and said high temperature flames are directed at an upper major surface of said advancing ribbon from said top line burner positioned above said advancing ribbon.

6. The method as in claim 5 wherein said heating step further includes positioning a bottom line heater below said glass ribbon and directing high temperature flames from said bottom line heater towards a lower major surface of said advancing ribbon along said line of cut and advancing said bottom line heater in the advancing direction of said ribbon.

7. The method as in claim 6 wherein said maintaining step includes maintaining said glass ribbon temperature at least as high as about the strain point temperature of said glass ribbon prior to said dividing step.

8. The method as in claim 6 wherein said maintaining step includes maintaining said ribbon temperature at least as high as about the annealing point temperature of said glass ribbon prior to said dividing step.

9. The method as in claim 8 wherein said directing step includes heating said line of cut to at least approximately 1300° F. (704° C.).

10. The method as in claim 9 wherein said dividing step includes penetrating at least a portion of the thickness of said glass ribbon along said line of cut with at least one blade paralleling said heated line of cut to form a severed glass sheet.

11. The method as in claim 10 wherein said dividing step includes penetrating the full thickness of said ribbon along said line of cut with said blade.

12. The method as in claim 11 further including the step of advancing said blade in the conveyed direction of said glass ribbon during said cutting step.

13. The method as in claim 12 mounting said line heaters and said blade on a sliding frame wherein said line heater advancing step includes advancing said frame so as to minimize relative movement between said line heaters and said glass and said blade advancing step includes advancing said frame so as to minimize relative movement between said blade and said glass.

14. The method as in claim 13 further including the step of advancing said frame in a direction opposite to the advancing direction of said glass after said line heater advancing step and prior to said blade advancing step.

15. The method as in claim 12 further including the step of transferring said severed glass sheet away from said remaining glass ribbon.

16. The method as in claim 15 wherein said transferring step includes engaging the upper major surface of said severed glass sheet with a vacuum pickup and moving said pickup with said glass engaged thereagainst to a subsequent process station.

17. The method as in claim 15 further including the step of supporting said glass ribbon in a gas hearth support bed and said transferring step includes supporting said glass ribbon on a downwardly inclined gas hearth support bed so as to allow said severed glass sheet to accelerate away from said remaining glass ribbon along said inclined gas hearth support bed.

18. The method as in claim 12 wherein said direction and dividing step includes directing heat and dividing said glass ribbon along a nonlinear line of cut.

19. The method as in claim 18 wherein said glass ribbon is a float glass ribbon.

20. The method as in claim 3 wherein said heating step includes directing said flame from a stationery line heater along a line of cut inboard of the longitudinally extending edge of said advancing glass ribbon wherein said line of cut on said ribbon advances relative to said heater.

21. The method as in claim 20 wherein said heating step further includes positioning a stationary bottom line heater below said glass ribbon and directing high temperature flames from said bottom line heater towards a lower major surface of said advancing ribbon along said line of cut as said ribbon advances between said top and bottom heaters.

22. The method as in claim 21 wherein said maintaining step includes maintaining said glass ribbon temperature at least as high as the strain point temperature of said glass ribbon prior to said dividing step.

23. The method as in claim 21 wherein said maintaining step includes maintaining said ribbon temperature at least as high as the annealing point temperature of said glass ribbon prior to said dividing step.

24. The method as in claim 23 wherein said directing step includes heating said line of cut to at least approximately 1300° F. (704° C.).

25. The method as in claim 24 wherein said dividing step includes penetrating a portion of the thickness of said glass ribbon along said advancing line of cut with at least one blade paralleling said heated line of cut to form a severed portion of said ribbon.

26. The method as in claim 24 wherein said dividing step include passing said advancing ribbon between a pair of rotary circular blades aligned with said advancing line of cut and penetrating at least a portion of the thickness of said glass ribbon with said blades.

27. The method as in claim 26 wherein said dividing step includes penetrating the full thickness of said ribbon along said line of cut with said blade.

28. The method as in claim 27 wherein said line of cut is slightly inboard of the advancing bulb edge of said ribbon, said severed portion of said ribbon being said bulb edge, and further including the step of biasing said severed bulb edge away from said remaining glass ribbon.

29. The method as in claim 1 wherein said glass is a glass sheet and further, wherein said establishing step includes heating said entire glass sheet to at least about the strain point of said glass.

30. The method as in claim 1 wherein said glass is a glass sheet and further, wherein said establishing step includes directing heat from a heating device towards a major surface of said glass sheet along said line of cut.

31. The method as in claim 30 wherein directing step includes directing flames from a line heater towards a surface of said glass sheet along said line of cut.

32. The method as in claim 31 wherein said directing step includes positioning a top line heater above an upper major surface of said glass sheet to direct said flames at said upper surface of said glass sheet along said line of cut.

33. The method as in claim 30 wherein said directing step further includes positioning a bottom line heater below said glass sheet and directing flames from said bottom line heater towards a lower major surface of said glass sheet along said line of cut.

34. The method as in claim 30 wherein said maintaining step includes maintaining said glass sheet temperature at least as high as about the strain point temperature of said glass sheet.

35. The method as in claim 30 wherein said maintaining step includes maintaining said glass sheet temperature at least as high as about the annealing point temperature of said glass sheet.

36. The method as in claim 35 wherein said directing step includes heating said line of cut to at least approximately 1300° F. (704° C.).

37. The method as in claim 36 wherein said dividing step includes penetrating at least a portion of the thickness of said glass sheet along said line of cut with at least one blade paralleling said heated line of cut.

38. The method as in claim 37 wherein said dividing step include penetrating full thickness of said glass sheet along said line of cut with said blade to form a divided portion of glass.

39. The method as in claim 37 wherein said directing and dividing steps include directing heat and dividing said glass sheet along a nonlinear line of cut.

40. The method as in claim 39 further including the step of moving said line heaters into close proximity to said major surface of said glass sheet to perform said heating step and thereafter removing said line burners and moving said blade into close proximity to said major surface of said glass sheet to perform said dividing step.

41. The method as in claim 40 wherein said transferring step includes engaging the upper major surface of said divided portion of said glass sheet with a vacuum pickup and moving said pickup with said divided portion of said glass sheet engaged thereagainst to a subsequent process station.

42. The method as in claim 39 including advancing said glass sheet from a heating station after said establishing step to a cutting station for said dividing step.

43. The method as in claim 39 further including the step of transferring said divided portion of said glass sheet away from the remaining portion of said glass sheet.

44. An apparatus for shearing glass along a selected line of cut while maintaining the optical properties of said glass comprising:
a supporting surface to support said glass;
means to maintain said glass at a temperature at which said glass is sufficiently rigid to be handled without marking or otherwise affecting its optical properties;
means to establish a heating pattern to heat said line of cut of said glass to or above its softening temperature and to heat portions of said glass in the vicinity of said line of cut to at least about the strain point temperature of said glass; and
means to penetrate at least a substantial portion of the thickness of said glass along said heat softened line of cut.

45. The apparatus as in claim 44 wherein said glass is an advancing continuous glass ribbon.

46. The apparatus as in claim 45 wherein said advancing continuous glass ribbon heated to at least about its strain point temperature and further including means to maintain said glass ribbon at least at about said strain point temperature.

47. The apparatus as in claim 46 wherein said establishing means includes at least one line heater to direct heat towards a major surface of said glass ribbon along said line of cut and means to advance said line heater in the advancing direction of said glass ribbon.

48. The apparatus as in claim 47 further including means to move said penetrating means in the advancing direction of said glass ribbon.

49. The apparatus as in claim 48 line heater advancing means include a movable support frame and said penetrating means is mounted on said frame.

50. The apparatus as in claim 47 wherein said establishing means includes a top line heater positioned above said glass ribbon to direct flames toward the upper major surface of said glass ribbon along said line of cut and said line heater advancing means is a top line heater advancing means and further including a bottom line heater positioned below said glass ribbon to direct flames towards the lower major surface of said glass ribbon along said selected line of cut and means to advance said bottom line heater in the advancing direction of said glass ribbon.

51. The apparatus as in claim 50 wherein said top heater advancing means and said bottom heater advancing means include a common movable support frame.

52. The apparatus as in claim 51 wherein said penetrating means includes a blade and an anvil member positioned with the major surfaces of said ribbon therebetween, wherein said blade and anvil generally parallel said heated line of cut and further including means to move said blade relative to said anvil to penetrate said ribbon along said heat softened line of cut to form a cut glass portion.

53. The apparatus as in claim 52 wherein said moving means moves said blade relative to said anvil to penetrate the full thickness of said ribbon along said line of cut.

54. The apparatus as in claim 51 wherein said dividing means includes at least one blade member positioned relative to a major surface of said ribbon generally parallel to said heated line of cut and further including means to move said blade member to penetrate at least a portion of the thickness of said ribbon along said line of cut.

55. The apparatus as in claim 54 wherein said dividing means includes a pair of opposing blade members positioned with the major surfaces of said ribbon therebetween, wherein said opposing blades generally parallel said heated line of cut and further including means to move said blades relative to each other to penetrate at least a portion of the thickness of said ribbon along said line of cut.

56. The apparatus as in claim 55 wherein said moving means moves said blades to penetrate the full thickness of said ribbon along said line of cut.

57. The apparatus as in claim 54 wherein said penetrating means is mounted on said common movable support frame.

58. The apparatus as in claim 57 further including means to move said cut glass portion away from said remaining glass ribbon.

59. The apparatus as in claim 58 wherein said supporting surface is a gas hearth bed, said bed being sloped slightly downward relative to said penetrating means such that said cut glass portion will accelerate away from said remaining glass ribbon so as to provide said cut glass portion moving means.

60. The apparatus as in claim 59 wherein said line heaters are nonlinear to direct heat along a nonlinear line of cut.

61. The apparatus as in claim 60 wherein said line of cut heated by said nonlinear line heaters defines the outline of a glass part.

62. The apparatus as in claim 58 wherein said support surface includes a series of conveyor rolls and said cut glass portion moving means includes a shuttling vacuum pickup positioned above said cut glass portion to engage said cut glass portion and move it away from said remaining glass ribbon.

63. The apparatus as in claim 44 wherein said glass is a glass sheet.

64. The apparatus as in claim 63 wherein said glass sheet is heated to at least about the strain point temperature of said glass and further including means to maintain said glass sheet at least about said strain point temperature.

65. The apparatus as in claim 64 wherein said establishing means includes at least one line heater to direct heat towards a major surface of said glass sheet along said selected line of cut.

66. The apparatus as in claim 63 wherein said establishing means includes a top line heater positioned above said glass sheet to direct flames towards the upper major surface of said glass sheet along the selected line of cut and a bottom line heater positioned below said glass sheet to direct flames towards the bottom surface of said glass ribbon along said selected line of cut.

67. The apparatus as in claim 66 wherein said penetrating means includes a blade and an anvil member positioned with the major surface of said glass sheet therebetween wherein said blade and anvil generally parallel said heated line of cut and means to move said blade relative to said heat softened anvil to penetrate said glass sheet along said line of cut to form a cut portion of said glass sheet.

68. The apparatus as in claim 67 wherein moving means moves said blade relative to said anvil to penetrate the full thickness of said sheet along said line of cut.

69. The apparatus as in claim 66 wherein said dividing means includes at least one blade member positioned relative to a major surface of said glass sheet generally parallel to said heated line of cut and means to move said blade member to penetrate at least a portion of the thickness of said glass sheet along said line of cut.

70. The apparatus as in claim 69 wherein said dividing means includes a pair of opposing blade members positioned with the major surfaces of said glass sheets positioned therebetween wherein said opposing blades generally parallel said heated line of cut and further including means to move said blades relative to each other to penetrate at least a portion of the thickness of said glass sheet along said line of cut.

71. The apparatus as in claim 70 wherein said moving means moves said opposing blades to penetrate the full thickness of said sheet along said line of cut.

72. The apparatus as in claim 69 further including means to move said cut portion of said glass sheet away from the remaining portion of said glass sheet.

73. The apparatus as in claim 72 wherein said cut portion moving means includes a shuttling vacuum pickup positioned above said cut portion of said glass sheet to engage said cut portion and move said cut portion away from aid remaining portion of said glass sheet.

74. The apparatus as in claim 73 further including means to advance said heated glass sheet from said heating means to said cutting means.

75. The apparatus as in claim 73 wherein said line heaters are nonlinear to direct heat along a nonlinear line of cut.

76. The apparatus as in claim 75 wherein said line of cut heated by said nonlinear line heaters defines the outline of a glass part.

77. The apparatus as in claim 46 wherein said establishing means includes at least one stationery line heater to direct heat towards a major surface of said glass ribbon along said line of cut inboard of the longitudinal edges of said advancing ribbon.

78. The apparatus as in claim 46 wherein said establishing means includes a stationary top line heater positioned above said glass ribbon to direct flames toward the upper major surface of said glass ribbon along said line of cut and a stationary bottom line heater positioned below said glass ribbon to direct flames towards the lower major surface of said glass ribbon along said selected line of cut wherein said line of cut on said ribbon advances between said heaters.

79. The apparatus as in claim 78 wherein said penetrating means includes a blade positioned downstream from said heaters along said heated line of cut wherein said blade penetrates said ribbon along said heat softened line of cut to form main glass ribbon portion and an edge ribbon portion.

80. The apparatus as in claim 78 wherein said penetrating means includes a pair of circular blades aligned downstream from said heaters along each of said lines of cut, said blades rotating about an axis generally transverse to the advancing direction of said ribbon wherein said line of cut on said ribbon advances between said blades to penetrate said ribbon to form a main glass ribbon portion and an edge ribbon portion.

81. The apparatus as in claim 80 wherein said pair of blades fully penetrate said advancing ribbon as the ribbon passes between said blades to form said main glass ribbon portion and an edge ribbon portion.

82. The apparatus as in claim 81 further including means to bias said edge portion away from said main portion.

* * * * *